United States Patent Office 2,725,375
Patented Nov. 29, 1955

2,725,375

ICE COLORS OF THE ACRIDONE SERIES

Frederick Brody, New York, N. Y., assignor to American Cyanamid Company, New York, N. Y., a corporation of Maine No Drawing. Original application March 1, 1952, Serial No. 274,487, now Patent No. 2,694,713, dated November 16, 1954. Divided and this application January 12, 1954, Serial No. 403,661

3 Claims. (Cl. 260—152)

This invention relates to azo coloring matters of the formula

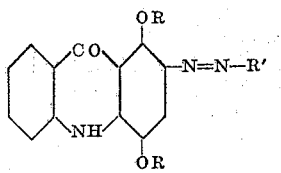

in which R is a lower alkyl group and R' is the residue of an ice color coupling component.

In the past it has been difficult to obtain stable azo dyes and pigments of a greenish blue shade. We have found that when compounds of the formula

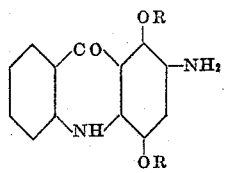

in which R is a lower alkyl group, are diazotized and coupled with ice color coupling components, a new series of azo coloring matters is produced. When the coupling components are arylides of 2-hydroxy-3-naphthoic acid, the coloring matters have an unusual greenish shade of blue with good fastness properties. These are the preferred embodiments of the invention which, however, is not limited to coloring matters obtained by coupling with these particular coupling components. In other words, the invention is not limited to the production of blue azo coloring matters, though these are of particular importance, because other shades are obtainable with other ice-color coupling components.

The amines which are diazotized to produce the diazo components entering into the coloring matters of the present invention are themselves new compounds. They are, however, not claimed in this application, forming the subject matter of my copending application, Serial No. 274,487, filed March 1, 1951, now Patent No. 2,694,713, of which the present application is a division.

The alkoxy groups in the coloring matters of the present invention may be methoxy, ethoxy, propoxy, etc., or other lower alkoxy groups, but the best and most useful coloring matters are obtained from the methoxy compound, which therefore constitutes the preferred embodiment. The invention, however, is not limited to coloring matters containing the methoxy group.

It is an advantage of the present invention that the amino acridones can be diazotized by ordinary methods and require no special procedures. Also, these diazo compounds may be used in the various common ways for preparing azoic coloring matters. Thus, for example, they may be coupled with coupling components, particularly ice color components, to form dyestuffs or pigments, or the coupling component can be padded on cloth and the coloring matter developed in the fiber. It is also possible to transform the diazo compounds into the diazoamino and other stable derivatives, so that they may be incorporated into a printing paste, the color being developed on the goods by acid development in the usual manner.

Among the ice color coupling components which are particularly suitable for use in coupling with the diazotized compounds of the present invention are the following: beta-naphthol, 8-amino-2-naphthol, 8-acetylamino-2-naphthol, benzyl naphthols, pyrazolones and pyrazyl pyrazolones, hydroxybenzofluorenones; and the various N-substituted amides such as arylides of 2-hydroxy-3-naphthoic acid, of 2-hydroxy-3-anthroic acid, of methyl and dimethyl-salicylic acids, of hydroxybenzacridone carboxylic acids, of hydroxydibenzofuran carboxylic acids, of hydroxybenzothiophene carboxylic acids, of acetoacetic acid, of benzoylacetic acid and the like.

This invention is further illustrated by the following examples. Where not otherwise noted, parts are by weight.

Example 1

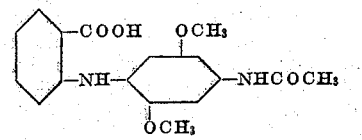

A mixture of 6.3 parts of 2,5-dimethoxy-4-aminoacetanilide, 6.03 parts of 2-bromobenzoic acid, 6.2 parts of anhydrous potassium carbonate, 0.05 part of copper powder, 0.05 part of iodine and 40 parts of anyl alcohol is refluxed until condensation is complete. The solvent is removed by steam distillation and the residual, black product recrystallized from a mixture of dioxane and water.

Example 2

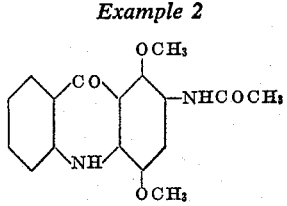

A mixture of 4.9 parts of the product of Example 1 with 3.5 parts of phosphorus pentachloride in 35 parts of benzene is shaken at room temperature while there is gradually added an additional 3 parts of phosphorus pentachloride, the temperature being raised to reflux during the latter part of this operation. The mixture is then thoroughly cooled and there is added gradually to it 9 parts of stannic chloride, followed after an interval by ice and concentrated hydrochloric acid. The resulting product is filtered and recrystallized from aqueous alcohol.

Example 3

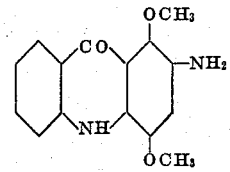

Hydrolysis of the product of Example 2 is readily carried out by refluxing in a solution prepared from 5 parts of potassium hydroxide, 4 parts of water and 16 parts alcohol. The product is isolated by drowning and filtration and may be recrystallized from butanol.

Example 4

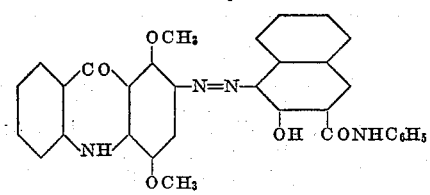

The above blue dyestuff is obtained by diazotizing the product of Example 3 in the ordinary way with nitrite and acid and developing in the diazo solution a length of cotton cloth padded with an alkaline solution of 2-hydroxy-3-naphthoic anilide.

Example 5

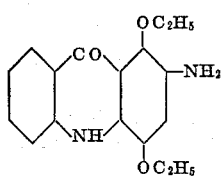

The procedure of Examples 1–3 are followed, substituting 2,5-diethoxy-4-aminoacetanilide for the 2,5-dimethoxy-4-aminoacetanilide in Example 1. The resulting diethoxy acridone compound is obtained in good yield and can be used in the same manner as the product of Example 3. For instance, it may be diazotized and coupled with 2-hydroxy-3-naphthoic anilide to produce a blue dyestuff, differing only slightly in shade from the product of Example 4.

I claim:
1. An azo coloring matter of the formula

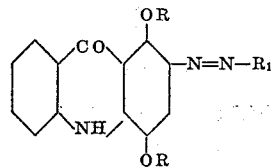

in which R is a lower alkyl group and $R_1$ is the residue of an ice-color coupling component of the naphthalene series.

2. An azo coloring matter of the formula

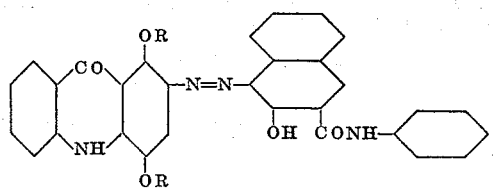

in which R is lower alkyl.

3. An azo coloring matter of the formula

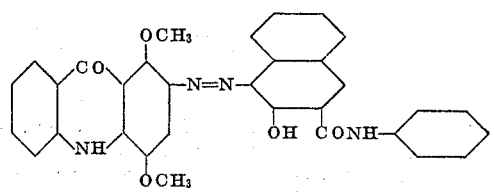

No references cited.